United States Patent Office 3,163,578
Patented Dec. 29, 1964

3,163,578
ALKYLTHIOSTEROIDS AND METHODS OF
THEIR PREPARATION
Klaus Bruckner, Darmstadt-Eberstadt, and Karl-Heinz Bork, Griesheim, near Darmstadt, Germany, assignors to E. Merck Aktiengesellschaft, Darmstadt, Germany
No Drawing. Filed July 1, 1963, Ser. No. 292,091
Claims priority, application Germany, July 3, 1962,
M 53,421
11 Claims. (Cl. 167—74)

The present invention relates to new and useful steroids of the androstane series.

It is an object of this invention to provide novel compounds having a valuable physiological activity as well as compositions containing these compounds together with pharmaceutically acceptable excipients.

It is a further object of this invention to provide a new process for producing said compounds.

Still another object is to provide a method of effecting anabolic activity in mammals.

Still additional objects include the employment of certain of these steriods which are particularly suitable for the treatment of animals such as cattle, pigs, and sheep.

Other objects and advantages of this invention will become apparent upon further study of the specification and appended claims.

The new steroids of this invention may be represented by the Formula I

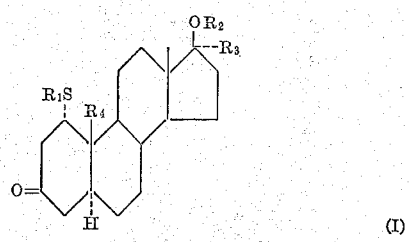

wherein
$R_1$ designates methyl, ethyl, propyl or iso-propyl;
$R_2$ designates H or an acyl group having from 1 to 10 carbon atoms;
$R_3$ designates H, methyl or ethyl;
$R_4$ designates H or $CH_3$.

The new alkylthiosteroids are very useful therapeutics. They exhibit a good anabolic activity and a high index of anabolic to androgenic effect.

The new compounds of this invention may be prepared from 3-keto-1-dehydro steroids of the Formula II

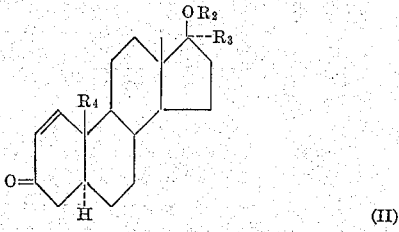

wherein $R_2$, $R_3$ and $R_4$ have the above meaning. A compound of Formula II is reacted with an alkylmercaptan, the alkyl group of which contains from 1 to 3 carbon atoms. Furthermore, hydroxy groups of the final products may be esterified in the usual way to form pharmaceutically acceptable esters.

The alkyl mercaptans are added easily to the $\Delta^1$-double bond of the compounds of Formula II. It is possible to use the alkyl mercaptan as a solvent in this reaction; however, if desired, also inert organic solvents may be added such as dioxane, benzene, dimethylformamide or tertiary alcohols. Preferably an alkaline catalyst is added such as pyridine, piperidine, morpholine, an alkali metal alcoholate or an alkali metal hydroxide. In some cases, also acid catalysts are suitable, for instance hydrogen chloride. The reaction may be carried out at room temperature but may be accelerated by heating or boiling the solution even under pressure, for example in a bomb tube.

Suitable alkyl mercaptans are methyl-, ethyl-, n-propyl-, and iso-propyl mercaptans.

When carrying out the reaction, ester groups of the starting material may be saponified by the influence of the basic catalyst, especially when the reaction mixture is heated.

Hydroxy groups present in the starting material or in the end products may be esterified in the usual way, if desired. For such an esterification, all acids or their derivatives suitable to form esters may be used which result in the formation of pharmaceutically acceptable esters, such as the esters of the following acids: carboxylic acids such as formic, acetic, propionic, butyric, trimethylacetic, enanthic, cyclopentyl propionic, cyclohexyl propionic, phenylpropionic, caproic, and caprylic acid.

According to the present invention, for example the following alkylthiosteroids as well as their 17-esters may be prepared: 1α-methylthio-androstane-17β-ol-3-one, 1α-ethylthio-androstane-17β-ol - 3 - one, 1α-propylthio-androstane-17β-ol-3-one, 1α-isopropylthio-androstane - 17β-ol-3-one, 1α-methylthio-17α-methyl-androstane-17β-ol-3-one, 1α-ethylthio-17α-methyl-androstane-17β-ol-3-one.

Among the starting materials of Formula II of the androstane series, the 1-androstene-17β-ol-3-one and the 17α-methyl derivative thereof are described in J. Org. Chem., vol. 27, p. 248 (1962).

17α-ethyl-1-androstene-17β-ol-3-one is available from epi-androsterone which is treated in a Grignard reaction with ethyl magnesium iodide and then oxidized with $CrO_3$ in a known manner. Bromination yields 2-bromo-17α-ethyl-androstane-17β-ol-3-one which is dehydrohalogenated in the usual way with $Li_2CO_3$ in dimethylformamide.

The 19-nor-1-androstene-17β-ol-3-one is known from "Chemistry and Industry," 1962, p. 1467. The process described in this reference is used as well to prepare the corresponding 17α-methyl and 17α-ethyl derivatives thereof whereby the 17α-alkyl group is introduced in the usual way by a Grignard reaction.

The new compounds may be used as anabolic agents. In general, they are administered in combination with pharmaceutically acceptable carriers the choice of which is determined by the desired route of administration. The new compounds can be used as medicaments in the form of pharmaceutical preparations, which contain the new compounds in admixture with a pharmaceutical organic or inorganic solid or liquid carrier suitable for enteral, parenteral or topical administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly, cholesterol or any other known carrier for medicaments. The pharmaceutical preparations may be, for example, in the form of tablets, dragées, salves, creams, or in liquid form as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances. The new compositions contain preferably from about 10 to 200 mg., preferably 50 to 100 mg., of the new alkylthiosteroids per dosage unit.

The new active substances are especially valuable for the treaatment of all those conditions which require an enhanced formation of protein, such as underweight, post operative conditions, osteoporosis, and in geriatrics.

The following examples are to illustrate but are in no way intended to limit the present invention.

Example 1

1.7 g. 1-androstene-17β-ol-3-one-acetate are heated in a bomb tube for 20 hours at about 70° C. with 0.7 ml. piperidine and 35 ml. ethyl mercaptan. The oily residue obtained upon evaporation of the excess mercaptan is recrystallized from methanol. The 1α-ethylthio-androstane-17β-ol-3-one-acetate melts at 121–122° C. $(\alpha)_D^{22}$ +70° (chloroform).

Example 2

1 g. 1-androstene-17β-ol-3-one-acetate are heated in a bomb tube for 20 hours at about 105° C. with 20 ml. dioxane, 0.5 ml. piperidine and 5 ml. of methyl mercaptan. The excess mercaptan is distilled off under reduced pressure and the residue is recrystallized from ether. The 1α-methylthio-androstane-17β-ol-3-one-acetate melts at 163–164° C. $(\alpha)_D^{22}$ +56° (chloroform).

Example 3

1 g. 17α-methyl-1-androstene-17β-ol-3-one are heated for 20 hours at about 115° C. in a bomb tube with 0.4 ml. piperidine and 35 ml. ethyl mercaptan. The reaction mixture is evaporated and the residue is recrystallized from ether. The 1α-ethylthio-17α-methyl-androstane-17β-ol-3-one melts at 99–102° C. $(\alpha)_D^{22}$ +60° (chloroform).

In an analogous manner, 1α-ethylthio-17α-ethyl-androstane-17β-ol-3-one and 1α-n-propylthio-17α-ethyl-androstane-17β-ol-3-one are prepared from 17α-ethyl-1-androstene-17β-ol-3-one by reaction with ethyl mercaptan and n-propylmercaptan respectively.

Example 4

According to the method described in Example 3, 1α-methylthio-17α-methyl-androstane-17β-ol-3-one is prepared from 17α-methyl-1-androstene-17β-ol-3-one. M.P. 144–145° C. (ether). $(\alpha)_D^{22}$ +40° (chloroform).

Example 5

2.3 g. 1-androstene-17β-ol-3-one-acetate, 1 ml. piperidine and 50 ml. propyl mercaptan are heated for 20 hours to about 110° C. in a bomb tube. The excess mercaptan is evaporated and the oily residue is recrystallized from hexane. The 1α-n-propylthio-androstane-17β-ol-3-one-acetate melts at 83–84° C. (hexane); $(\alpha)_D$ +84° (dioxane).

Example 6

1.2 g. 17α-methyl-1-androstene-17β-ol-3-one, 0.5 ml. piperidine and 20 ml. propyl mercaptan are heated for 15 hours to about 90° C. The reaction mixture is diluted with ether and washed to neutrality with water. From concentrated ether extract the 1α-n-propylthio-17α-methyl-androstane-17β-ol-3-one is crystallized. M.P. 106–109° C. $(\alpha)_D$ +53° (dioxane).

In a similar manner, the following compounds are prepared: 1α-n-propylthio-androstane-17β-ol-3-one and 1α-iso-propylthio-androstane-17β-ol-3-one from 1-androstene-17β-ol-3-one; both compounds may be converted by customary methods into esters such as the propionate, the enanthate, the cyclohexylpropionate, and the phenylpropionate.

Example 7

3 g. 1-androstene-17β-ol-3-one, 20 ml. dioxane and 1 ml. piperidine and 15 ml. methyl mercaptan are heated in a bomb tube for 18 hours at about 110° C. The reaction mixture is concentrated and the residue is recrystallized from ether whereby the 1α-methylthio-androstan-17β-ol-3-one is obtained.

Example 8

(a) The 1α-ethylthio-androstane-17β-ol-3-one is prepared from 1-androstene-17β-ol-3-one according to the method described in Example 1.

(b) 1.4 g. 1α-ethylthio-androstane-17β-ol-3-one are allowed to stand at room temperature for 18 hours in a mixture of 15 ml. anhydrous pyridine and 15 ml. propionic anhydride. The reaction mixture is poured into ice-cooled dilute hydrochloric acid. The 1α-ethylthio-androstane-17β-ol-3-one-propionate is filtered off and recrystallized from hexane.

In a similar manner, 1α-ethylthio-androstane-17β-ol-3-one-enanthate, 1α-ethylthio-androstane-17β-ol-3-one-phenylpropionate, and 1α-ethylthio-androstane-17β-ol-3-one-cyclohexylpropionate is obtained.

Example 9

A solution of 3.2 g. 1-androstene-17β-ol-3-one in 55 ml. glacial acetic acid is allowed to stand at room temperature for 3 days with 1 ml. of 37% aqueous hydrochloric acid and 20 ml. ethyl mercaptan. The reaction mixture is diluted with water and extracted with chloroform. The combined extracts are washed with dilute sodium bicarbonate solution and water. They are dried and concentrated under reduced pressure. Upon addition of ether, the 1α-ethylthio-androstane-17β-ol-3-one crystallizes.

Example 10

3 g. 17α-methyl-1-androstene-17β-ol-3-one are allowed to stand at room temperature for 3 days with 100 ml. glacial acetic acid, 2 ml. 37% aqueous hydrochloric acid and 20 ml. isopropylmercaptn. The reaction mixture is worked up as described in Example 9. The 1α-isopropylthio-17α-methyl-androstane-17β-ol-3-one is recrystallized from petroleum ether.

Example 11

According to the method described in Example 1, 19-nor-1-androstene-17β-ol-3-one-acetate is reacted with ethylmercaptan to form 19-nor-1α-ethylthio-androstane-17β-ol-3-one-acetate.

Example 12

According to the method described in Example 3, 19-nor-17α-ethyl-1-androstene-17β-ol-3-one is reacted with ethyl mercaptan to form 19-nor-1α-ethylthio-17α-ethyl-androstane-17β-ol-3-one.

The following specific embodiments are exemplary of the various pharmaceutical compositions and methods of treatment of the invention. These embodiments are not to be considered to be limitative of the remaining specification and appended claims.

|  | Mg. |
|---|---|
| A. Injection solution: 1 ampoule contains— | |
| 1α - methylthio - androstane - 17β - ol - 3 - one-cyclohexylpropionate | 100 |
| Mixture of the triglycerides of saturated fatty acids containing 6, 8, 10, and 12 carbon atoms ad 1 ml. | |
| B. Tablets: 1 tablet contains— | |
| 1α - ethylthio - 17α - methyl-androstane-17β-ol-3-one | 50 |
| Lactose | 120 |
| Potato starch | 20 |
| Magnesium stearate | 10 |
| C. Coated tablets: 1 tablet contains— | |
| 1α - n - propylthio - androstane - 17β - ol - 3-one-propionate | 60 |
| Lactose | 80 |
| Talc | 8 |
| Magnesium stearate | 2 |

The tablet is coated according to well known methods with sugar syrup.

D. Injection solution: 1 ampoule contains— Mg.
  1α - isopropylthio - androstane - 17β - ol - 3-
    one-phenylpropionate _____ 50
  Castor oil (sterile) ad 1 ml.

What is claimed is:
1. Alkylthiosteroids of the formula

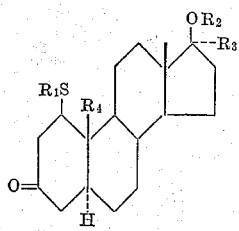

wherein $R_1$ designates a member of the group consisting of methyl, ethyl, propyl and iso-propyl $R_2$ designates a member of the group consisting of hydrogen and an acyl group having 1–10 carbon atoms $R_3$ designates a member of the group consisting of hydrogen, methyl, and ethyl $R_4$ designates a member of the group consisting of hydrogen and methyl.

2. A compound selected from the group consisting of 1α-methylthio-androstane-17β-ol-3-one and the pharmaceutically acceptable esters thereof said esters selected from the group consisting of formate, acetate, propionate, butyrate, trimethylacetate, enanthate, cyclopentyl propionate, cyclohexyl propionate, phenylpropionate, caproate, and caprylate.

3. A compound selected from the group consisting of 1α-ethylthio-androstane-17β-ol-3-one and the pharmaceutically acceptable esters thereof said esters selected from the group consisting of formate, acetate, propionate, butyrate, trimethylacetate, enanthate, cyclopentyl propionate, cyclohexyl propionate, phenylpropionate, caproate, and caprylate.

4. A compound selected from the group consisting of 1α-n-propylthio-androstane-17β-ol-3-one and the pharmaceutically acceptable esters thereof said esters selected from the group consisting of formate, acetate, propionate, butyrate, trimethylacetate, enanthate, cyclopentyl propionate, cyclohexyl propionate, phenylpropionate, caproate, and caprylate.

5. A compound selected from the group consisting of 1α-iso-propylthio-androstane-17β-ol-3-one and the pharmaceutically acceptable esters thereof said esters selected from the group consisting of formate, acetate, propionate, butyrate, trimethylacetate, enanthate, cyclopentyl propionate, cyclohexyl propionate, phenylpropionate, caproate, and caprylate.

6. 1α-ethylthio-17α-methyl-androstane-17β-ol-3-one.

7. 1α - n - propylthio - 17α - methyl - androstane - 17β-ol-3-one.

8. 1α-ethylthio-17α-ethyl-androstane-17β-ol-3-one.

9. 1α - n - propylthio - 17α - ethyl - androstane - 17β-ol-3-one.

10. An anabolic composition in unit dosage form for the treatment of mammals requiring enhanced formation of protein which composition contains 10–200 mg. of the compound of claim 1 and a pharmaceutically acceptable carrier.

11. A method of effecting increased anabolic activity in mammals which method comprises administering an effective amount of a compound of claim 1 and a pharmaceutically acceptable carrier.

References Cited by the Examiner
UNITED STATES PATENTS 2,875,215  2/59  Dodson _____ 260—397.3
2,979,518  4/61  Van Dorp et al. _____ 260—397.45

LEWIS GOTTS, Primary Examiner.